US009373246B2

(12) United States Patent
Fiske et al.

(10) Patent No.: US 9,373,246 B2
(45) Date of Patent: Jun. 21, 2016

(54) ALARM CONSOLIDATION SYSTEM AND METHOD

(75) Inventors: Adam M. Fiske, North Kingstown, RI (US); Katie M. Hargraves, Warwick, RI (US); Michael B. Condor, Peace Dale, RI (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 884 days.

(21) Appl. No.: 12/700,665

(22) Filed: Feb. 4, 2010

(65) Prior Publication Data

US 2011/0187488 A1 Aug. 4, 2011

(51) Int. Cl.
*G05B 23/02* (2006.01)
*G08B 26/00* (2006.01)
*G08B 5/36* (2006.01)

(52) U.S. Cl.
CPC ................ *G08B 26/008* (2013.01); *G08B 5/36* (2013.01)

(58) Field of Classification Search
USPC ............. 340/3.1, 539.1, 539.16, 539.22, 540, 340/506–508
See application file for complete search history.

(56) References Cited

U.S. PATENT DOCUMENTS

| | | | | |
|---|---|---|---|---|
| 5,499,196 | A | 3/1996 | Pacheco | |
| 6,018,300 | A * | 1/2000 | Dowden et al. | 340/635 |
| 6,263,455 | B1 * | 7/2001 | Bannister | H04L 41/0681 714/25 |
| 6,437,691 | B1 | 8/2002 | Sandelman et al. | |
| 6,816,878 | B1 * | 11/2004 | Zimmers et al. | 709/200 |
| 7,318,009 | B2 * | 1/2008 | Beam et al. | 702/188 |
| 7,456,736 | B2 | 11/2008 | Primm | |
| 2002/0095269 | A1 * | 7/2002 | Natalini et al. | 702/188 |
| 2006/0230434 | A1 | 10/2006 | Sunagawa | |
| 2006/0238339 | A1 * | 10/2006 | Primm et al. | 340/540 |
| 2006/0265397 | A1 * | 11/2006 | Bryan et al. | 707/10 |
| 2008/0079561 | A1 | 4/2008 | Trundle et al. | |

FOREIGN PATENT DOCUMENTS

CN 1171181 A 1/1998

OTHER PUBLICATIONS

International Search Report and Written Opinion from PCT/US2011/023548 dated Apr. 15, 2011.

* cited by examiner

*Primary Examiner* — Firmin Backer
*Assistant Examiner* — Nay Tun
(74) *Attorney, Agent, or Firm* — Lando & Anastasi, LLP

(57) ABSTRACT

Methods and system for consolidating alarms using a data center monitoring appliance are provided. The method includes receiving at least one alarm from an physical infrastructure device via the network, determining that the at least one alarm is subject to a consolidation filter, the consolidation filter specifying characteristics of a consolidated alarm and generating the consolidated alarm according to the characteristics specified in the consolidation filter. The system includes a network interface, a memory and a controller coupled to the network interface and the memory and configured to receive at least one alarm from an physical infrastructure device via the network interface, determine that the at least one alarm is subject to a consolidation filter, the consolidation filter specifying characteristics of a consolidated alarm and generate the consolidated alarm according to the characteristics specified in the consolidation filter.

14 Claims, 8 Drawing Sheets

ALARM CONSOLIDATION SYSTEM AND METHOD

BACKGROUND

1. Field of the Invention

At least one aspect in accord with the present invention relates generally to apparatus and processes for monitoring data centers, and more specifically, to apparatus and processes for reporting correlated alarms in a coordinated manner.

2. Discussion of Related Art

Data center monitoring systems provide for the efficient monitoring of large scale computing environments. Conventional data center monitoring systems include sensors that monitor the operating environment of a data center and, in some case, the operational status of individual pieces of equipment. Under some configurations, these sensors report operational information to a centralized system that analyzes the operational information and generates any warranted alarms. Alarms are customarily reported to personnel charged with maximizing the uptime of data center equipment.

SUMMARY OF THE INVENTION

Aspects in accord with the present invention manifest an appreciation that conventional data center monitoring systems can produce voluminous information in which events that should be reported in a coordinated fashion are instead reported as disparate events. According to various examples, aspects provide for the generation and distribution of consolidated alarms via one or more consolidation filters. In these examples, consolidation filters direct the gathering and reporting of individual alarms in the aggregate. Thus examples provide for more relevant notifications that allow external entities, such as data center technicians, to more efficiently address potential problems encountered within the data center operating environment.

According to at least one aspect, a method for consolidating alarms using a data center monitoring appliance coupled to a network is provided. The method includes acts of receiving at least one alarm from an physical infrastructure device via the network, determining that the at least one alarm is subject to a consolidation filter, the consolidation filter specifying characteristics of a consolidated alarm and generating the consolidated alarm according to the characteristics specified in the consolidation filter.

In the method, the act of receiving the at least one alarm may include an act of receiving a plurality of alarms. In addition, the act of receiving the plurality of alarms may include acts of receiving at least one alarm triggered by event information from a contact sensor and receiving at least one alarm triggered by event information from a humidity sensor. Further, the act of receiving the plurality of alarms may include acts of receiving a first alarm at a first time and receiving a second alarm at a second time and the act of determining that the at least one alarm is subject to the consolidation filter may include an act of calculating a difference between the first time and the second time. Moreover, the act of receiving the plurality of alarms may include acts of receiving a first alarm at a first time and receiving a second alarm at a second time and the act of determining that the at least one alarm is subject to the consolidation filter may include an act of calculating a difference between the second time and a current time.

The method may further include an act of reporting the consolidated alarm to an external entity when a difference between the first time and the current time exceeds a threshold value. In the method, the act of determining that the at least one alarm is subject to the consolidation filter may include an act of determining that the at least one alarm belongs to an alarm group. Additionally, the act of determining that the at least one alarm belongs to the alarm group may include an act of reading the alarm group from the consolidation filter. Further, the method may further include an act of reporting the consolidated alarm to an external entity. Moreover, the method may further include an act of determining that the consolidated alarm is subject to a notification policy. According to the method, the notification policy may specify a communication method and the act of reporting the consolidated alarm may include an act of providing the consolidated alarm according to the communication method.

According to another aspect, a data center management appliance is provided. The data center management appliance includes a network interface, a memory and a controller coupled to the network interface and the memory. The controller is configured to receive at least one alarm from an physical infrastructure device via the network interface, determine that the at least one alarm is subject to a consolidation filter, the consolidation filter specifying characteristics of a consolidated alarm and generate the consolidated alarm according to the characteristics specified in the consolidation filter.

In the data center management appliance, the controller configured to receive the at least one alarm may be further configured to receive a plurality of alarms. In addition, the controller configured to receive the plurality of alarms may be further configured to receive at least one alarm triggered by event information from a contact sensor and receive at least one alarm triggered by event information from a humidity sensor. Further, the controller configured to receive the plurality of alarms may be further configured to receive a first alarm at a first time, receive a second alarm at second time and calculate a difference between the first time and the second time. Moreover, the controller configured to receive the plurality of alarms may be further configured to receive a first alarm at a first time, receive a second alarm at second time and calculate a difference between the second time and a current time. Additionally, the controller may be further configured to report the consolidated alarm to an external entity when a difference between the first time and the current time exceeds a threshold value. Furthermore, the controller configured to determine that the at least one alarm is subject to the consolidation filter may be further configured to determine that the at least one alarm belongs to an alarm group.

Also, in the data center management appliance, the controller configured to determine that the at least one alarm belong to the alarm group may be further configured to read the alarm group from the consolidation filter. In addition, the controller may be further configured to report the consolidated alarm to an external entity. Further, the controller may be further configured to determine that the consolidated alarm is subject to a notification policy, the notification policy specifying a communication method and provide the consolidated alarm according to the communication method.

Still other aspects, examples, and advantages of these exemplary aspects and examples, are discussed in detail below. Any example disclosed herein may be combined with any other example in any manner consistent with at least one of the objects, aims, and needs disclosed herein, and references to “an example,” “some examples,” “an alternate example,” “various examples,” “one example,” “at least one example,” “this and other examples” or the like are not necessarily mutually exclusive and are intended to indicate that a particular feature, structure, or characteristic described in connection with the example may be included in at least one example. The appearances of such terms herein are not necessarily all referring to the same example. The accompanying drawings are included to provide illustration and a further understanding of the various aspects and examples, and are incorporated in and constitute a part of this specification. The drawings, together with the remainder of the specification, serve to explain principles and operations of the described and claimed aspects and examples.

BRIEF DESCRIPTION OF DRAWINGS

Various aspects of at least one example are discussed below with reference to the accompanying figures, which are not intended to be drawn to scale. Where technical features in the figures, detailed description or any claim are followed by references signs, the reference signs have been included for the sole purpose of increasing the intelligibility of the figures, detailed description, and claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure. The figures are provided for the purposes of illustration and explanation and are not intended as a definition of the limits of the invention. In the figures:

DETAILED DESCRIPTION

Figure 1:
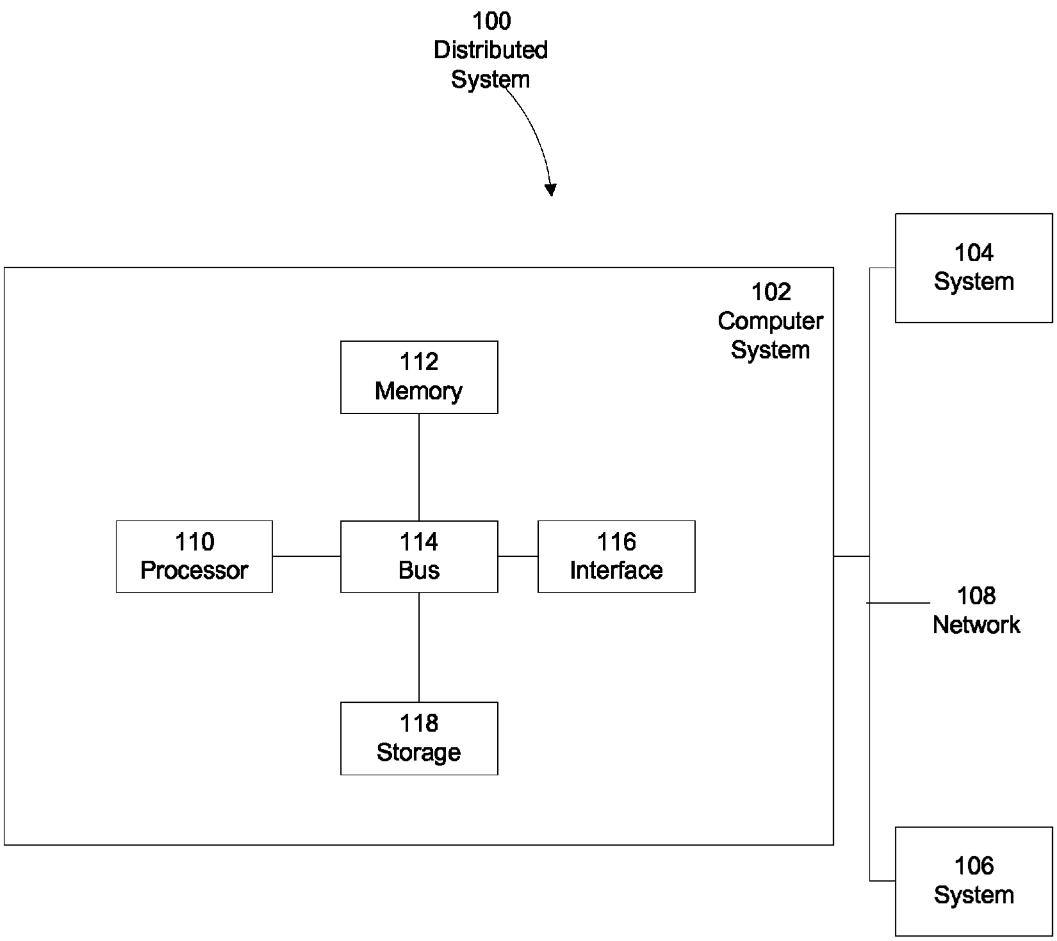
FIG. 1 is a block diagram of an example computer system in which various aspects in accord with the present invention may be implemented.

Aspects and examples relate to apparatus and processes that allow external entities, such as users or systems, to easily configure and maintain a set of consolidation filters and notification policies that produce and distribute consolidated alarms. In at least one example, a system and method are provided for generating one or more consolidated alarms based on one or more individual alarms having a common set of attributes. According to some examples, the consolidated alarm has discrete characteristics separate from the individual alarms that triggered the consolidated alarm. In other examples, the consolidated alarm combines, or aggregates, the individual alarm instances, thus allowing external entities to review both the consolidated alarm and the individual alarm instances.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, elements and features discussed in connection with any one or more examples are not intended to be excluded from a similar role in any other examples.

Also, the phraseology and terminology used herein is for the purpose of description and should not be regarded as limiting. Any references to examples or elements or acts of the apparatus and methods herein referred to in the singular may also embrace examples including a plurality of these elements, and any references in plural to any example or element or act herein may also embrace examples including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present apparatus and methods or their components to any one positional or spatial orientation.

Computer System

Various aspects and functions described herein may be implemented as hardware or software on one or more computer systems. There are many examples of computer systems currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects may be implemented in software, hardware or firmware, or any combination thereof. Thus, aspects may be implemented within methods, acts, systems, system elements and components using a variety of hardware and software configurations, and examples are not limited to any particular distributed architecture, network, or communication protocol.

Referring to FIG. 1, there is illustrated a block diagram of a distributed computer system 100, in which various aspects and functions may be practiced. The distributed computer system 100 may include one more computer systems that exchange, i.e. send or receive, information. For example, as illustrated, the distributed computer system 100 includes computer systems 102, 104 and 106. As shown, the computer systems 102, 104 and 106 are interconnected by, and may exchange data through, communication a network 108. The network 108 may include any communication network through which computer systems may exchange data. To exchange data using the network 108, the computer systems 102, 104 and 106 and the network 108 may use various methods, protocols and standards, including, among others, Token Ring, Ethernet, Wireless Ethernet, Bluetooth, TCP/IP, UDP, DTN, HTTP, FTP, SNMP, SMS, MMS, SS7, JSON, SOAP, CORBA, REST and Web Services. To ensure data transfer is secure, the computer systems 102, 104 and 106 may transmit data via the network 108 using a variety of security measures including, for example, TSL, SSL or VPN. While the distributed computer system 100 illustrates three networked computer systems, the distributed computer system 100 is not so limited and may include any number of computer systems and computing devices, networked using any medium and communication protocol.

Various aspects and functions may be implemented as specialized hardware or software executing in one or more computer systems including the computer system 102 shown in FIG. 1. As depicted, the computer system 102 includes a processor 110, a memory 112, a bus 114, an interface 116 and a storage 118. The processor 110 may perform a series of instructions that result in manipulated data. The processor 110 may be a commercially available processor such as an Intel Xeon, Itanium, Core, Celeron, Pentium, AMD Opteron, Sun UltraSPARC, IBM Power5+, or IBM mainframe chip, but may be any type of processor, multiprocessor or controller. The processor 110 is connected to other system elements, including one or more memory devices 112, by the bus 114.

The memory 112 may be used for storing programs and data during operation of the computer system 102. Thus, the memory 112 may be a relatively high performance, volatile, random access memory such as a dynamic random access memory (DRAM) or static memory (SRAM). However, the memory 112 may include any device for storing data, such as a disk drive or other non-volatile storage device. Various examples may organize the memory 112 into particularized and, in some cases, unique structures to perform the functions disclosed herein.

Components of the computer system 102 may be coupled by an interconnection element such as the bus 114. The bus 114 may include one or more physical busses, for example, busses between components that are integrated within a same machine, but may include any communication coupling between system elements including specialized or standard computing bus technologies such as IDE, SCSI, PCI and InfiniBand. Thus, the bus 114 enables communications, for example, data and instructions, to be exchanged between system components of the computer system 102.

The computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 102 to exchange information and communicate with external entities, such as users and other systems.

The storage system 118 may include a computer readable and writeable nonvolatile data storage medium in which instructions are stored that define a program that may be executed by the processor 110. The storage system 118 also may include information that is recorded, on or in, the medium, and this information may be processed by the processor 110 during execution of the program. More specifically, the information may be stored in one or more data structures specifically configured to conserve storage space or increase data exchange performance. The instructions may be persistently stored as encoded signals, and the instructions may cause the processor 110 to perform any of the functions described herein. The medium may, for example, be optical disk, magnetic disk or flash memory, among others. In operation, the processor 110 or some other controller may cause data to be read from the nonvolatile recording medium into another memory, such as the memory 112, that allows for faster access to the information by the processor 110 than does the storage medium included in the storage system 118. The memory may be located in the storage system 118 or in the memory 112, however, the processor 110 may manipulate the data within the memory 112, and then copy the data to the medium associated with the storage system 118 after processing is completed. A variety of components may manage data movement between the medium and integrated circuit memory element and examples is not limited thereto. Further, examples are not limited to a particular memory system or storage system.

Although the computer system 102 is shown by way of example as one type of computer system upon which various aspects and functions may be practiced, aspects are not limited to being implemented on the computer system 102 as shown in FIG. 1. Various aspects and functions may be practiced on one or more computers having a different architectures or components than that shown in FIG. 1. For instance, the computer system 102 may include specially programmed, special-purpose hardware, such as for example, an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 102 may be a computer system including an operating system that manages at least a portion of the hardware elements included in the computer system 102. Usually, a processor or controller, such as the processor 110, executes an operating system which may be, for example, a Windows-based operating system, such as, Windows NT, Windows 2000 (Windows ME), Windows XP or Windows Vista operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular implementation.

The processor 110 and operating system together define a computer platform for which application programs in high-level programming languages may be written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C# (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used.

The examples disclosed herein may perform a wide variety of functions and may be implemented using various tools. For instance, aspects of an exemplary system may be implemented using an existing commercial product, such as, for example, Database Management Systems such as SQL Server available from Microsoft of Seattle Wash., Oracle Database from Oracle of Redwood Shores, Calif., and MySQL from Sun Microsystems of Santa Clara, Calif. or integration software such as Web Sphere middleware from IBM of Armonk, N.Y. A computer system running, for example, SQL Server may be able to support both aspects in accord with specific examples disclosed herein and databases for sundry other applications not discussed in the present disclosure. Thus, functional components disclosed herein may include a wide variety of elements, such as executable code, data structures or objects, configured to perform their described functions.

System Context Diagram

Figure 2:
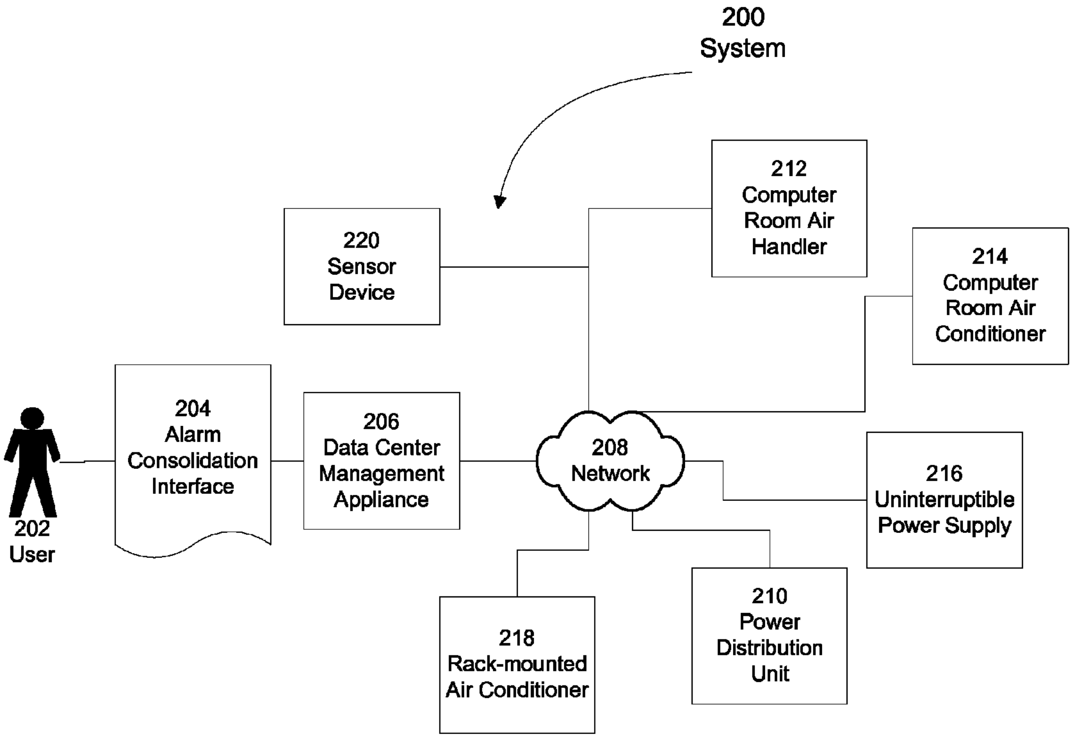
FIG. 2 is a block diagram of a data center including a data center management appliance in accord with aspects of the present invention.

FIG. 2 presents a context diagram including physical and logical elements of distributed system 200. As shown, distributed system 200 is specially configured to perform the various functions disclosed herein. The system structure and content disclosed with regard to FIG. 2 is for exemplary purposes only and is not intended to limit examples to the specific structure shown in FIG. 2. As will be apparent to one of ordinary skill in the art, many variant exemplary system structures can be architected. The particular arrangement presented in FIG. 2 was chosen to promote clarity.

Information may flow between the elements, components and subsystems described herein using any technique. Such techniques include, for example, passing the information over the network via TCP/IP, passing the information between modules in memory and passing the information by writing to a file, database, or some other non-volatile storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples discussed herein.

Referring to FIG. 2, a system 200 includes a user 202, an alarm consolidation interface 204, a data center management appliance 206, a communications network 208 and a set of physical infrastructure devices. Examples of physical infrastructure devices include generators, uninterruptible power supplies (UPSs), transformers, power distribution units (PDUs), outlets, computer room air handlers (CRAHs), rack-mounted air conditioners (RMACs), computer room air conditioners (CRACs), environmental sensors, such as temperature, humidity and airflow sensors, and security devices, such as security cameras, door contact sensors and the like. While physical infrastructure devices may include enough computing resources to control the operation of the physical infrastructure device, these computing resources are limited and tailored to support the operation of the physical infrastructure devices. In at least one example, these limited computer resources may be disposed upon a Network Management Card (NMC) such as a UPS NMC available from APC by Schneider Electric. The particular physical infrastructure devices shown in FIG. 2 include a PDU 210, a CRAH 212, a CRAC 214, a UPS 216 and a RMAC 218, and a sensor device 220.

Each of the physical infrastructure devices shown in FIG. 2 may transmit event information via the network 208 to the data center management appliance 206. The network 208 may be, among other types of networks, a private network (such as a LAN, WAN, extranet or intranet) or may be a public network (such as the internet). In the example shown, the network 208 is a LAN.

The event information transmitted via the network 208 may include any information regarding the operations of the physical infrastructure devices or information regarding the operating environment of the physical infrastructure devices. For example, the sensor device 220 may be an environmental sensor that provides information regarding ambient conditions near the sensor device 220, such as the NetBotz® device available from APC by Schneider Electric. In other examples, the sensor 200 may be a contact sensor or security camera. In each of these examples, the data center management appliance 206 includes elements configured to receive the event information and to generate alarms based on this event information.

In one example, the system 200 is configured to present the alarm consolidation interface 204 to an external entity, such as the user 202. The alarm consolidation interface 204 includes elements configured to create, store, modify, delete or otherwise configure consolidation filters and notification policies. In addition, the alarm consolidation interface 204 includes elements configured to search and present triggered consolidated alarms to the external entity. In at least one example, the alarm consolidation interface 204 is a browser-based user interface served and rendered by the data center management appliance 206. In other examples, other suitable user and system interfacing technologies may be used. Thus, according to a variety of examples, the alarm consolidation interface 204 may include a plurality of individual interfaces that provide for configuration and review of consolidation filters, notification polices and consolidated alarms.

According to various examples, the consolidation filter defines one or more characteristics of a consolidated alarm that is generated when the data center management appliance 206 generates a member of an alarm group associated with the consolidated alarm. Example characteristics of a consolidated alarm that may be configured via a consolidation filter include a description, root cause, severity and recommended response. In some of these examples, the consolidation filter also specifies the members of the alarm group that is associated with the consolidated alarm. In these examples, an alarm group may include one or more alarms with one or more common attributes. The common attributes that may be used to form the alarm group include both physical and logical attributes. Physical attributes may include a physical location (such as a particular rack, row, room, building, etc.) of the device reporting event information that triggers an alarm. Logical attributes may include an identifier of a reporting device or membership of the reporting device in a logical group, such as an arbitrary, user-assigned device group, a network segment, power path group, cooling zone group, capacity group or device functional type. Logical attributes may also include the content, or type, of the alarm, and the time the alarm was reported or initiated. Examples of the alarm content include, among others, severity, temperature, humidity, airflow information, contact sensor information, power information, network connectivity information, device error or failure information, motion detection information and sound detection information.

Also, in these examples, a notification policy defines the manner in which an external entity, such as the user 202 or a separate system, will be provided one or more consolidated alarms generated via one or more consolidation filters. Example delivery methods for consolidated alarms include, among others, email, FTP, HTTP and SNMP. Examples of consolidation filters and notification policies are discussed further below.

As shown in FIG. 2, the data center management appliance 206 presents the consolidation interface 204 to the user 202. A data center management appliance is a specialized computing device engineered to provide data center design, monitoring and configuration services. According to one example, the data center management appliance 206 is an InfraStruXure® Central Server appliance available from APC by Schneider Electric. As illustrated, the data center management appliance 206 may exchange or store information with the physical infrastructure devices and the sensor device 220 via the network 208. This information may include any information required to support the features and functions of the data center management appliance 206. For example, this information may include event information which is further processed by the data center management appliance 206 into alarms and consolidated alarms.

According to various examples, the data center management appliance 206 includes elements configured to produce a variety of consolidation filters. In one example, the data center management appliance 206 can create a consolidation filter that aggregates environmental and temporal information provided by several alarms into a single consolidated alarm. For instance, a user may wish to be notified when a contact door sensor is open for greater than four minutes and the humidity within an enclosure is over 67%. Given this goal, the user can configure a consolidation filter to produce a consolidated alarm when both an alarm indicating that a door of an enclosure is open for greater than four minutes and an alarm indicating that the humidity within the enclosure is over 67% are generated within a particular time window. In addition, the user can configure this consolidated alarm to provide a suggested root cause of the alarm such as, "The humidity is too high because the door was left open." In another example, a user may wish to be notified when the rate of increase of humidity in a space is greater than 10% in 10 minutes, but only when no doors to the space are open. In this case, the user can configure a consolidation filter to produce a consolidate alarm when this situation occurs.

In another example, the data center management appliance 206 is configured to implement consolidation filters that prevent overly repetitious reporting of alarms. In this example, the data center management appliance 206 implements a consolidation filter that combines, into one or more consolidated alarms, individual alarms that occur during a specified time window and that are initiated by members of a particular logical or physical grouping of physical infrastructure devices. For instance, the data center management appliance 206 can be configured with a consolidation filter that combines all alarms that are initiated within a 90 second window from a particular room of a data center.

In another example, the data center management appliance 206 includes elements configured to provide notifications of consolidated alarms according to a notification policy. In this example, the data center management appliance 206 exposes an interface through which the user 202 can configure notification policies. Once these notification policies are configured and associated with one or more consolidation filters, the data center management appliance 206 can deliver consolidated alarms according to the applicable notification policies. Thus examples of the data center management appliance 206 allow users to configure consolidated alarms that provide more targeted and meaningful information than conventional monitoring and alarm systems.

Information, including consolidation filters and notification policies, may be stored on the data center management appliance 206 in any logical construction capable of storing information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Example System Architecture

Figure 3:
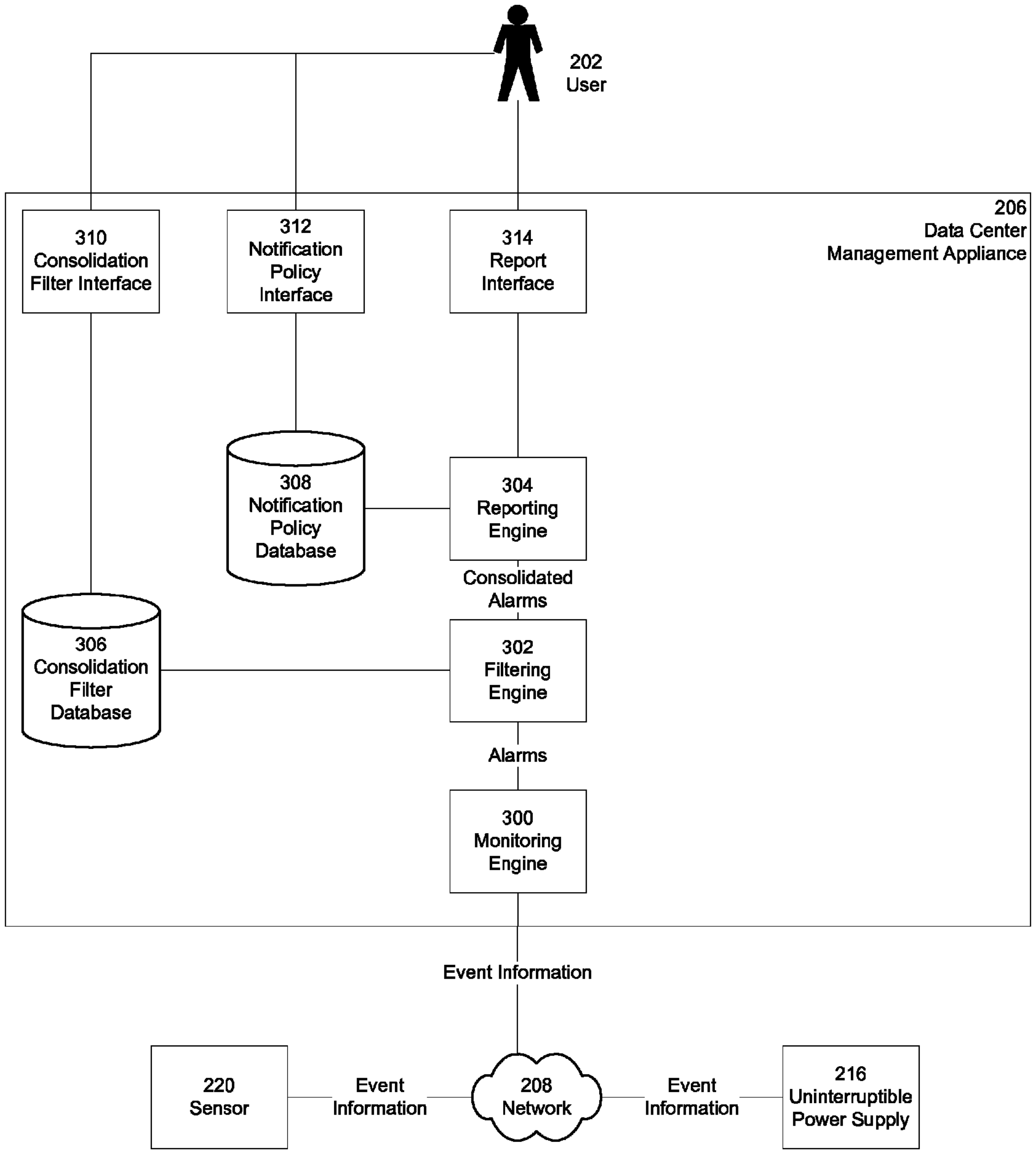
FIG. 3 is a block diagram of a data center management appliance in accord with the present invention.

FIG. 3 provides a more detailed illustration of a particular physical and logical configuration of the data center management appliance 206. The system structure and content discussed below are for exemplary purposes only and are not intended to limit examples to the specific structure shown in FIG. 3. As will be apparent to one of ordinary skill in the art, many variant exemplary system structures can be architected. The particular arrangement presented in FIG. 3 was chosen to promote clarity.

In the example shown in FIG. 3, the data center management appliance 206 includes a monitoring interface 300, a filtering engine 302, a reporting engine 304, a consolidation filter database 306, a notification policy database 308, a consolidation filter interface 310, a notification policy interface 312 and a report interface 314. As shown, the consolidation filter interface 310 exchanges configuration information pertaining to consolidation filters with external entities such as the user 202 and the consolidation filter database 306. The notification policy interface 312 exchanges configuration information relevant to notification policies with external entities and the notification policy database 308. The reporting interface 314 exchanges alarm reporting information with external entities and the reporting engine 304.

Continuing the example illustrated in FIG. 3, the reporting engine 304 exchanges alarm reporting information with the notification policy database 308 and the reporting interface 314. In addition, the reporting engine 304 exchanges consolidated alarms information with the filtering engine 302. The filtering engine 302 exchanges consolidation filter information with the consolidation filter database 306, consolidated alarm information with the reporting engine 304 and alarm information with the monitoring interface 300. The monitoring interface 300 exchanges alarm information with the filtering engine 302 and event information with external event reporting physical infrastructure devices such as UPS 216 and sensor device 220 via the network 208.

In the example depicted in FIG. 3, the consolidation filter database 306 includes elements configured to store and retrieve consolidation filter information. In general, this consolidated filter information may include any information that specifies how alarms should be combined into consolidated alarms. According to one example, consolidation filter information includes, among other information, information regarding the consolidation filter itself and information regarding the consolidated alarms produced via the consolidation filter. In this example, the information regarding the consolidation filter itself includes, among other information, a consolidation filter identifier (such as a unique number), a consolidation filter name, a consolidation filter description and one or more alarm types to which the consolidation filter applies. Additionally, in this example, the information regarding the consolidated alarms generated via the consolidation filter includes, among other information, a severity for the consolidated alarm, one or more recommended responses to the consolidated alarm and one or more potential root causes for the consolidated alarm.

Continuing the example depicted in FIG. 3, the notification policy database 308 includes elements configured to store and retrieve notification policy information. In general, this notification policy information may include any information that specifies how consolidated alarms should be reported. According to one example, notification policy information includes, among other information, information regarding to the notification policy itself and information regarding the notifications produced via the notification policy. In this example, the information about the notification policy itself includes, among other information, a notification policy identifier (such as a unique number), a notification policy name, a notification policy description and one or more consolidated alarms to which the notification policy applies. Additionally, in this example, the information regarding the notifications includes the content and format of the notification, an identifier of one or more external entities, such as a user or external system, to whom the consolidated alarm should be sent and a communication method, such as an email or inter-process communication, that should be used to notify the external entity.

The databases 306 and 308 may take the form of any logical construction capable of storing information on a computer readable medium including flat files, indexed files, hierarchical databases, relational databases or object oriented databases. In addition, links, pointers, indicators and other references to data may be stored in place, of or in addition to, actual copies of the data. The data may be modeled using unique and foreign key relationships and indexes. The unique and foreign key relationships and indexes may be established between the various fields and tables to ensure both data integrity and data interchange performance.

Furthermore, the structure and content of each of these various fields and tables depends on the type of data stored therein. Thus, in at least one example, the data structures and objects used to store the notification policy information differ from the data structures and objects used to store the consolidation policy information. Consequently, in this example, any process that accesses this data must be specially configured to account for the type of data accessed.

As depicted in FIG. 3, the data center management appliance 206 exposes several interfaces to exchange data with external entities. More particularly, in the example shown, the consolidation filter interface 310, the notification policy interface 312 and the report interface 314 exchange information with the user 202. Also, in the example shown, the monitoring interface 300 exchanges information with the sensor 220 and the UPS 216 via the network 208. In various examples, the interfaces 310, 312 and 314 employ a wide variety of technologies, user interface elements and interface metaphors to exchange information with external entities, such as the user 202.

In one example, the consolidation filter interface 310 includes elements configured to exchange consolidation filter information with the user 202. More particularly, in this example, the consolidation filter interface 310 is arranged to allow the user 202 to search, create, modify, delete or otherwise configure consolidation filter information. In addition, in this example, the consolidation filter interface 310 is arranged to store the consolidation filter information in, or retrieve the consolidation filter information from, the consolidation filter database 306.

In another example, the notification policy interface 312 includes elements configured to exchange notification policy information with the user 202. More particularly, in this example, the notification policy interface 312 is arranged to allow the user 202 to search, create, modify, delete or otherwise configure notification policy information. In addition, in this example, the notification policy interface 312 is arranged to store the notification policy information in, or retrieve the notification policy information from, the notification policy database 308.

In another example, the report interface 314 includes elements configured to exchange report information with the reporting engine 304 and one or more external entities. More particularly, in the example shown in FIG. 2, the report interface 314 is configured to allow the user 202 to search and review report information generated by the reporting engine 304. This reporting information may include any data pertinent to one or more consolidated alarms triggered by the filtering engine 302. For instance, in one example, the reporting interface 314 can allow a user to drill-down through consolidated alarms to review the individual alarms that are combined under the consolidated alarms. In addition, the reporting interface 314 may exchange report information using a variety of notification conduits such as email, HTTP, FTP, SNMP, among others.

Each of the interfaces disclosed herein exchange information with various providers and consumers. These providers and consumers may include any external entity including, among other entities, users and systems. In addition, each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the system or unauthorized access to the system.

In the example shown in FIG. 3, the monitoring engine 300 includes elements configured to receive event information from the network 208. As illustrated, this event information may be provided by a variety of physical infrastructure devices, such as the sensor 220 and the UPS 216. The monitoring engine 300 is configured to determine if inbound event information warrants triggering one or more alarms and further to transmit information regarding triggered alarms to the filtering engine 302.

Continuing this example, the alarms generated by the monitoring engine 300 can provide a wide range of information. For instance, the alarms can indicate internal device errors, such as a hard drive being full or failing. In addition, alarms can be triggered based on a comparison between one or more threshold values and information transmitted by a sensor. In some cases, the one or more threshold values may be specified by an external entity, such as a user. Examples of the types of information that a sensor may transmit include airflow information, audio information, power information (such as amps, watts, voltage and VA), dew point, humidity information, temperature and state information (door open/closed, camera motion detected, dry contact open/closed, etc). The comparisons that can be made between sensor and threshold values include whether: the sensor value exceeds the threshold value, the sensor value is below the threshold value, the sensor value falls between two threshold values, the sensor value has changed at rate equal to or greater than the threshold value, and for state sensors, whether the threshold state equals, or does not equal, the sensor state. Moreover, the comparison may consider the amount of time the tested for relationship persists, i.e. whether the relationship has lasted longer than a specified duration.

According to the example in FIG. 3, the filtering engine 302 includes elements configured to generate consolidated alarms. More specifically, in this example, the filtering engine 302 is configured to receive alarm information and to retrieve, using the alarm information, potentially applicable consolidation filter information from the consolidation filter database 306. In one example, the consolidation filter database 306 is indexed according to alarm type, thereby providing efficient access to consolidation filter information associated with one or more types of alarms.

In this example, the filtering engine 302 includes elements configured to analyze and apply one or more rules included in the potentially applicable consolidation filters. These rules may define whether or not the consolidation filters apply to given alarms instances and also may define the actions taken to generate consolidated alarms. In one example, the rules are stored in the form of logical propositions that evaluate to true or false. The logical propositions may be, for example, one or more logical implications that may be expressed in the form of X→Y of “if X then Y”. The logical propositions may include one or more logical operators. A non-limiting list of the logical operators that may be used in these logical propositions includes “and”, “or”, “xor” and “andnot.” The logical propositions may include other operators as well. For instance, in one example comparison operators, such as “<”, “>” and “=” may be used.

According to this example, the filtering engine 302 is configured to determine that a consolidation filter applies, or does not apply, when a particular alarm state exists. An alarm state may be defined as a set of one or more individual alarms having a specified state. Thus, in this example, a rule to generate a consolidated alarm when a contact door sensor is open for greater than four minutes and the humidity within an enclosure is over 67% may read as follows: “if (alarm1.type=‘contact’ and alarm1.duration>=4 min.) and (alarm2.type=‘humidity’ and alarm2.value>67%) then consolidated_alarm.generate(close_door)”. In another example, a rule to combine, into a single consolidated alarm, alarms that pertain to a specified time window and that are initiated by members of a particular logical or physical grouping of devices may read as follows: “if alarm1.type=comm_loss and alarm1.group=current_window.group and (alarm1.begin>=current_window.open and alarm1.begin<=current_window.close) then consolidated_alarm.generate(alarm1, current_window)”. In at least one example, the filtering engine 302 is configured to not report individual alarms that are subject to, and thus aggregated via, a consolidation filter. This configuration prevents reporting of redundant alarms.

Continuing the example illustrated in FIG. 3, the reporting engine 304 includes elements configured to report consolidated alarms. More specifically, in this example, the reporting engine 304 is configured to receive consolidated alarm information and to retrieve, using the consolidated alarm information, applicable notification policy information from the notification policy database 308. In one example, the notification policy database 308 is indexed according to consolidated alarm type, thereby providing efficient access to notification policy information associated with one or more types of consolidated alarms.

In this example, the reporting engine 304 includes elements configured to analyze and apply one or more rules included in the notification policies. These rules may define the actions taken to report consolidated alarms. In one example, the rules are stored in the form of logical implications, for example “if X then Y” statements as discussed above with regard to consolidation filters. In this example, the reporting engine 304 is configured to use these rules to determine the conduit of communication used to transmit notifications to external entities. According to various examples, any conduit through which computers may exchange information may be used. Some such conduits include email, FTP, HTTP, SNMP and many forms of inter-process communication, such as remote procedure calls and web service calls. In addition, according to some examples, the reporting engine 304 is configured to report consolidated alarms to a variety of computing platforms such as desktops, laptops and mobile computing devices. Thus the reporting engine 340 provides flexible facilities that allow for reporting of consolidated alarms via a variety of communications paths and techniques.

Alarm Filtering Processes

Figure 4:
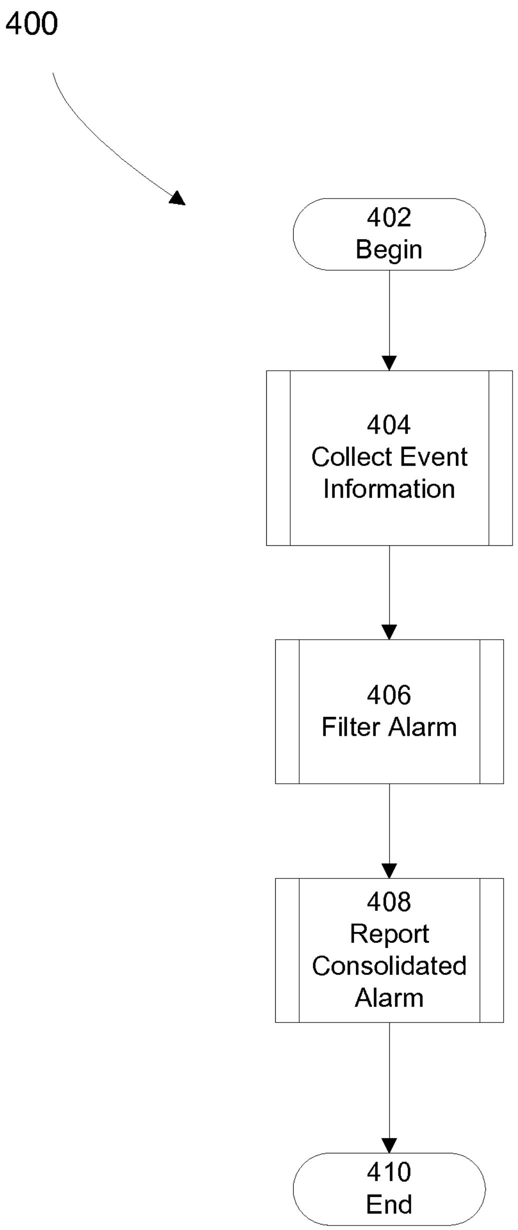
FIG. 4 is a flow chart of an example process for consolidating alarms in accord with aspects of the present invention.

Various examples provide processes for automated filtering and consolidation of the alarms generated from event information received via a network connecting various physical infrastructure devices. FIG. 4 illustrates one such process 400 that includes acts of receiving event information, filtering alarm information and reporting a consolidated alarm to an external entity. In at least one example in accord with FIG. 4, a data center management appliance arranged and configured as the data center management appliance 206 performs acts included process 400. Process 400 begins at 402.

In act 404, event information is collected. According to various examples, a data center management appliance collects the alarm information via a monitoring engine, such as the monitoring engine 300. Acts in accord with these examples are discussed below with reference to FIG. 5.

In act 406, alarm information is filtered. According to some examples, a data center management appliance filters the alarm information via a filtering engine, such as the filtering engine 302. Acts in accord with these examples are discussed below with reference to FIG. 6.

In act 408, consolidated alarm information is reported to an external entity. According to several examples, a data center management appliance provides the consolidated alarm information to an external entity via a reporting engine, such as the reporting engine 304. Acts in accord with these examples are discussed below with reference to FIG. 7.

Process 400 ends at 410. Automated filtering and consolidation processes in accord with process 400 increase the relevance of alarms issued from a data center management appliance. Thus processes like process 400 provide more useful notifications to users than do conventional processes.

Figure 5:
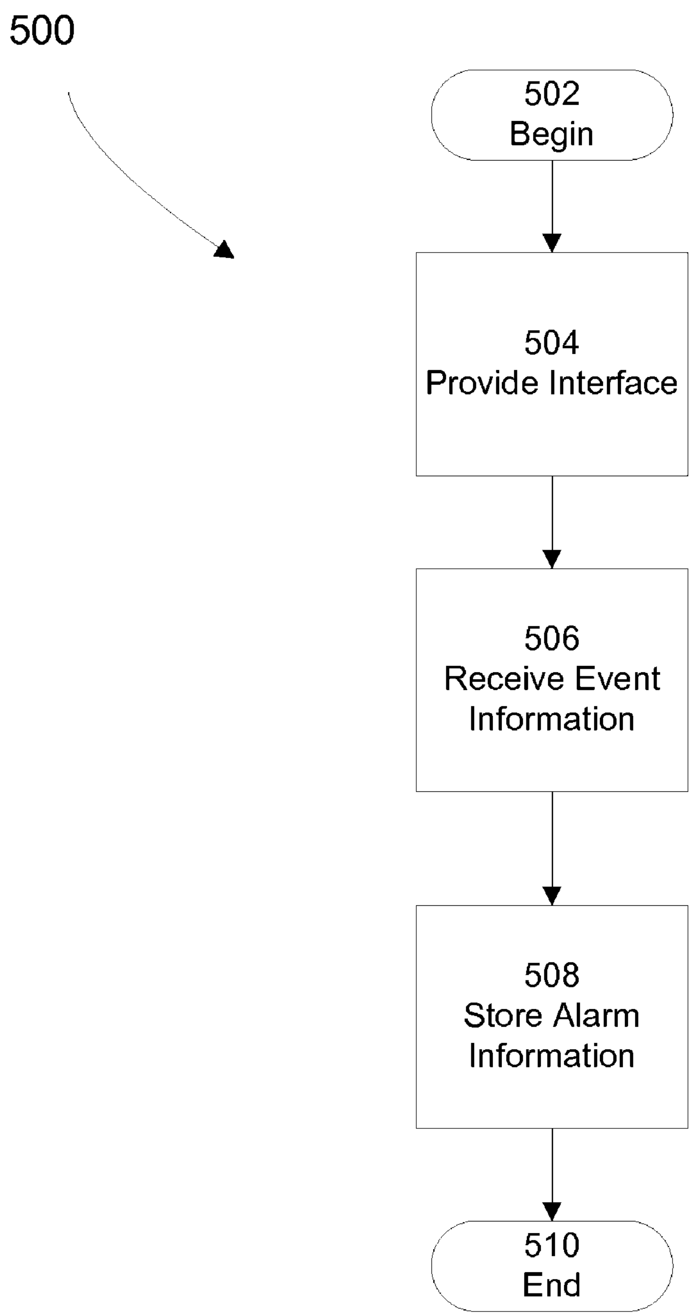
FIG. 5 is a flow chart of an example process for collecting event information in accord with aspects of the present invention.

As discussed above with regard to act 404 shown in FIG. 4, various examples provide processes for receiving event information. FIG. 5 illustrates one such process 500 that includes acts of providing an interface, receiving event information and storing alarm information. Process 500 begins at 502.

In act 504, a data center management appliance provides an interface through which the data center management appliance may receive alarm information. In at least one example, the data center management appliance performing this action exposes a system interface via a network, such as the network 208, to physical infrastructure devices, such as the UPS 216 and the sensor 220. In act 506, a data center management appliance receives event information from one or more physical infrastructure devices via the interface provided in act 504. In one example, the data center management appliance analyzes the event information to determine if the event information warrants issuing an alarm and, if so, creates alarm information. In act 508, the data center management appliance stores the alarm information in local storage, such as such as data storage 118.

Process 500 ends at 510. Various examples in accord with the process 500 enable data center management appliances to gather alarm information for later consolidation and reporting.

Figure 6:
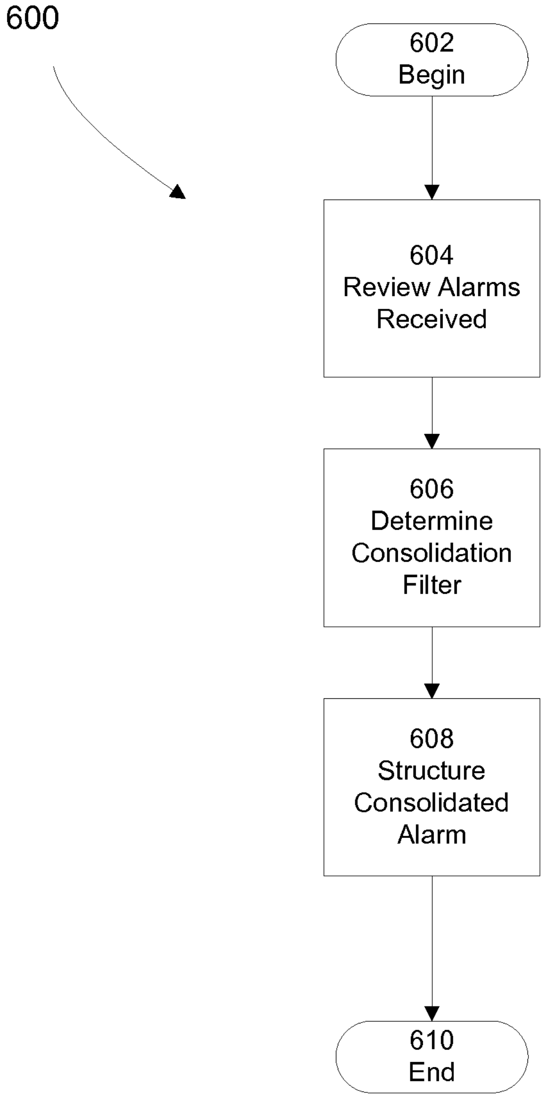
FIG. 6 is a flow chart of an example process for filtering alarm information in accord with aspects of the present invention.

As discussed above with regard to act 406 shown in FIG. 4, various examples provide processes for filtering alarm information to produce consolidated alarms. FIG. 6 illustrates one such process 600 that includes acts of reviewing alarms received, determining applicable consolidation filters and structuring and generating one or more consolidated alarms. Process 600 begins at 602

In act 604, a data center management appliance reviews locally stored alarm information and gathers potentially applicable consolidation filters for further analysis. In one example, the data center management appliance gathers the potentially applicable consolidation filters from a database, such as consolidation filter database 306. In this example, the data center management appliance retrieves the potentially applicable consolidation filters from the database using information included in the stored alarm information.

In act 606, a data center management appliance determines if the potentially applicable consolidation filters actually apply to the reviewed alarm information. In one example, the data center management appliance makes this determination by applying rules included within the potentially applicable consolidation filters to the reviewed alarm information. In act 608, the data center management appliance generates consolidated alarms via any consolidation filters that are applicable to the reviewed alarm information and structures and stores the consolidated alarm information in local storage, such as such as data storage 118.

Process 600 ends at 610. Processes in accord with the process 600 allow a data center management appliance to review, filter and consolidate its alarm history into a highly relevant and useful set of consolidated alarms.

Figure 7:
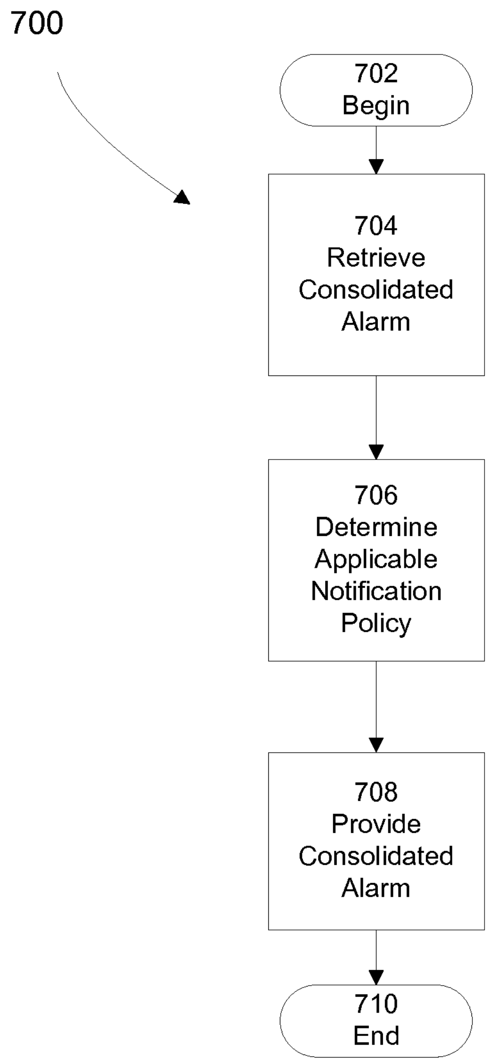
FIG. 7 is a flow chart of an example process for reporting consolidated alarms in accord with aspects of the present invention.

As discussed above with regard to act 408 shown in FIG. 4, various examples provide processes for a data center management appliance to report consolidated alarms to external entities. FIG. 7 illustrates one such process 700 that includes acts of retrieving consolidated alarms from local storage, determining notification policies that are applicable to the consolidated alarms and providing the consolidated alarms to external entities according the applicable notification policy. Process 700 begins at 702.

In act 704, a data center management appliance retrieves consolidated alarms. In one example, the data center management appliance retrieves the consolidated alarms from local storage. In act 706, the data center management appliance determines notification policies that apply to the retrieved consolidated alarms. In one example, the data center management appliance determines applicable notification policies by querying a notification policy database, such as the notification policy database 308, using consolidated alarm information. In act 708, a data center management appliance provides the consolidated alarms to external entities according to the applicable notification policy. In at least one example, the data center management appliance provides the consolidated alarms to various users on a variety of computing platforms, such as workstations, laptops and mobile computing devices.

Process 700 ends at 710. Upon completion of process 700, a data center management appliance has successfully consolidated individual alarm instances into one or more consolidated alarms, thereby increasing the relevance of this alarm information. As discussed above, more relevant notifications allow external entities, such as data center technicians, to more efficiently address potential problems encountered within the data center operating environment.

Each of processes 400 through 700 depicts one particular sequence of acts in a particular example. The acts included in each of these processes may be performed by, or using, one or more data center management appliances as discussed herein. Some acts are optional and, as such, may be omitted in accord with one or more examples. Additionally, the order of acts can be altered, or other acts can be added, without departing from the scope of the apparatus and methods discussed herein. In addition, as discussed above, in at least one example, the acts are performed on a particular, specially configured machine, namely a data center management appliance configured according to the examples disclosed herein.

Figure 8:
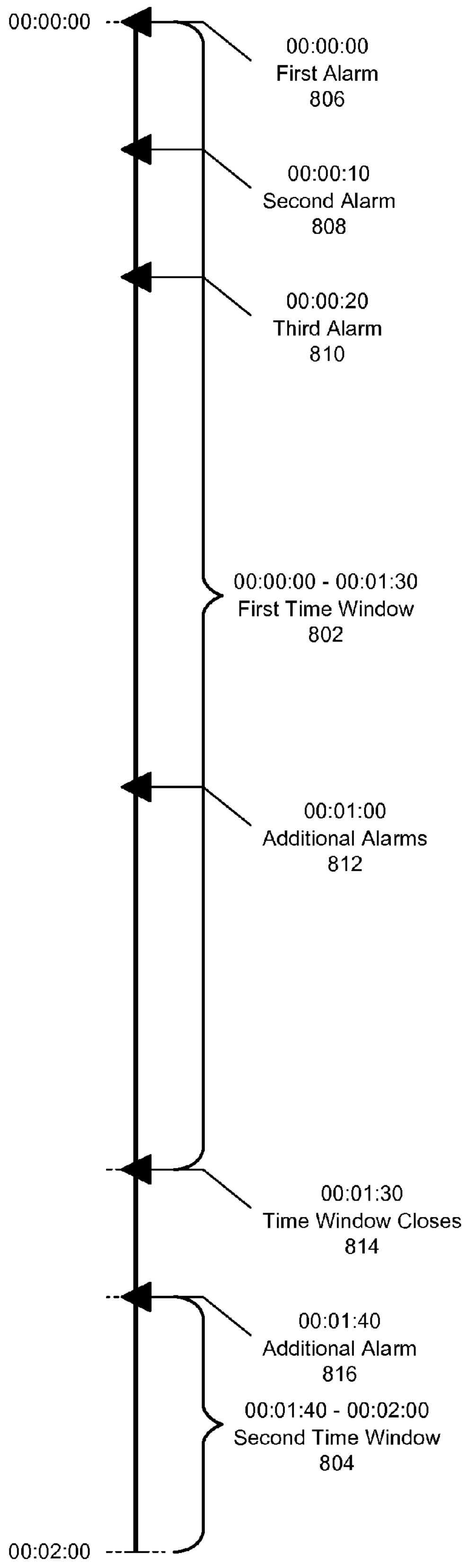
FIG. 8 is a timeline illustrating an alarm consolidation process in accord with aspects of the present invention.

FIG. 8 illustrates the operation of a data center management appliance implementing a consolidation filter that consolidates alarms belonging to an alarm group. FIG. 8 includes a timeline 800 which spans two time intervals, time windows 802 and 804, and milestones 806, 808, 810, 812, 814 and 816. As is illustrated by milestones 808, 810 and 812 and discussed further below, while the time window 802 is open, other alarms sharing specified attributes with the first alarm are aggregated into one or more consolidated alarms.

At milestone 806, the data center management appliance generates (and reports as a first consolidated alarm) a first alarm that is subject to the implemented consolidation filter. Additionally, at milestone 806, the data center management appliance opens the time window 802. In this example, the data center management appliance is configured to maintain time windows of a 90 second duration, however examples are not limited to a particular duration.

For instance, according to another example, a consolidation filter is configured to implement a rolling time window. In this example, the time window remains open until the data center management appliance does not generate of an alarm within the alarm group for a specified amount of time. In other examples with a rolling time window, the consolidation filter is configured to periodically issue consolidated alarms upon expiration of a specified duration. These periodic notifications ensure that the rolling time window does not inhibit timely reporting of consolidated alarms, even if the underlying alarm instances continue for a excessive period of time.

Returning to the example of FIG. 8, at milestone 808, the data center management appliance generates a second alarm. At this point, no additional notifications are reported but the second alarm is aggregated into the previously reported consolidated alarm. At milestone 810, the data center management appliance generates a third alarm. Again, no additional notifications are reported, but the third alarm is aggregated into the previously report consolidated alarm. Similarly, at milestone 812, the data center management appliance generates additional alarms, none of which are reported, but each of which is aggregated into the previously reported consolidated alarm. At milestone 814, time window 802 closes and a second consolidated alarm is reported that contains all of the details of each alarm instance that was aggregated into the consolidated alarm. As illustrated by milestone 816, additional alarms that occur outside of the first time window 802 are aggregated under a separate consolidated alarm that is associated with the second time window 804. By grouping individual alarms under the second consolidated alarm, the data center management appliance streamlines the notification process by avoiding repetitious reporting of redundant alarms.

Having now described some illustrative aspects, it should be apparent to those skilled in the art that the foregoing is merely illustrative and not limiting, having been presented by way of example only. Similarly, aspects may be used to achieve other objectives. For instance, in one example, instead of (or in addition to) reporting consolidated alarms, the data center management appliance may take corrective action based on the generation of a consolidated alarm. In another instance, examples are used to monitor physical infrastructure devices that reside outside of a data center, such as devices in wiring closets, point-of-sale terminals and server rooms. Numerous modifications and other illustrative examples are within the scope of one of ordinary skill in the art and are contemplated as falling within the scope of the apparatus and methods disclosed herein. In particular, although many of the examples presented herein involve specific combinations of method acts or system elements, it should be understood that those acts and those elements may be combined in other ways to accomplish the same objectives.

What is claimed is:

1. A method for consolidating alarms using a data center monitoring device coupled to a network, the method comprising:

receiving a first alarm of a plurality of alarms from at least one physical infrastructure device via the network, the at least one physical infrastructure device including at least one of an uninterruptible power supply (UPS) and a power distribution unit (PDU);

determining that the first alarm is subject to a consolidation filter, including determining that the first alarm belongs to an alarm group, wherein the consolidation filter specifies characteristics of a consolidated alarm;

generating a first instance of the consolidated alarm according to the characteristics specified in the consolidation filter;

adding information regarding details of the first alarm to the first instance of the consolidated alarm;

reporting, in response to receiving the first alarm prior to receiving other alarms, the first instance of the consolidated alarm, including the information regarding the details of the first alarm;

receiving a second alarm of the plurality of alarms;

receiving a third alarm of the plurality of alarms;

determining that the second alarm and the third alarm are subject to the consolidation filter, including determining that the second alarm and third alarm belong to the alarm group, the first alarm, the second alarm, and the third alarm having common attributes including a physical location and a power path;

generating a second instance of the consolidated alarm;

adding the information regarding the details of the first alarm, information regarding details of the second alarm and information regarding details of the third alarm to the second instance of the consolidated alarm; and reporting the second instance of the consolidated alarm, including the information regarding the details of the first alarm, the information regarding the details of the second alarm, and the information regarding the details of the third alarm.

2. The method according to claim 1, wherein receiving the second alarm includes receiving at least one alarm triggered by event information from a contact sensor, and receiving the third alarm includes receiving at least one alarm triggered by event information from a humidity sensor.

3. The method according to claim 1, wherein receiving the first alarm includes receiving the first alarm at a first time, receiving the second alarm includes receiving the second alarm at a second time, and determining that the second alarm is subject to the consolidation filter includes calculating a difference between the first time and the second time.

4. The method according to claim 1, wherein receiving the first alarm includes receiving the first alarm at a first time, receiving the second alarm includes receiving the second alarm at a second time, and determining that the second alarm is subject to the consolidation filter includes calculating a difference between the second time and a current time.

5. The method according to claim 4, wherein reporting the second instance of the consolidated alarm includes reporting the second instance of the consolidated alarm when a difference between the second time and the current time exceeds a threshold value.

6. The method according to claim 1, wherein determining that the second alarm and the third alarm belong to the alarm group includes reading the alarm group from the consolidation filter.

7. The method according to claim 1, further comprising determining that the first instance of the consolidated alarm is subject to a notification policy, the notification policy specifying a communication method, wherein reporting the first instance of the consolidated alarm includes providing the first instance of the consolidated alarm according to the communication method.

8. A data center management device comprising:

a network interface;

a memory; and a controller coupled to the network interface and the memory and configured to:

receive a first alarm of a plurality of alarms from at least one physical infrastructure device via the network interface, the at least one physical infrastructure device including at least one of an uninterruptible power supply (UPS) and a power distribution unit (PDU);

determine that the first alarm is subject to a consolidation filter, and that the first alarm belongs to an alarm group, wherein the consolidation filter specifies characteristics of a consolidated alarm;

generate a first instance of the consolidated alarm according to the characteristics specified in the consolidation filter;

add information regarding details of the first alarm to the first instance of the consolidated alarm;

report, in response to receiving the first alarm prior to receiving other alarms, the first instance of the consolidated alarm, including the information regarding the details of the first alarm;

receive a second alarm of the plurality of alarms;

receive a third alarm of the plurality of alarms;

determine that the second alarm and the third alarm are subject to the consolidation filter and belong to the alarm group, the first alarm, the second alarm, and the third alarm having common attributes including a physical location and a power path;

generate a second instance of the consolidation alarm;

add the information regarding the details of the first alarm, information regarding details of the second alarm and information regarding details of the third alarm to the second instance of the consolidated alarm; and report the second instance of the consolidation alarm, including the information regarding the details of the first alarm, the information regarding the details of the second alarm, and the information regarding the details of the third alarm.

9. The data center management device according to claim 8, wherein the controller is further configured to:

receive at least one alarm triggered by event information from a contact sensor; and receive at least one alarm triggered by event information from a humidity sensor.

10. The data center management device according to claim 8, wherein the controller receives the first alarm at a first time, receives the second alarm at a second time, and is further configured to calculate a difference between the first time and the second time.

11. The data center management device according to claim 8, wherein the controller receives the first alarm at a first time, receives the second alarm at a second time, and is further configured to calculate a difference between the second time and a current time.

12. The data center management device according to claim 11, wherein the controller is further configured to report the second instance of the consolidated alarm when a difference between the second time and the current time exceeds a threshold value.

13. The data center management device according to claim 8, wherein the controller is configured to determine that the second alarm and the third alarm belong to the alarm group by, at least in part, reading the alarm group from the consolidation filter.

14. The data center management device according to claim 8, wherein the controller is further configured to:

determine that the first instance of the consolidated alarm is subject to a notification policy, the notification policy specifying a communication method; and provide the first instance of the consolidated alarm according to the communication method.

* * * * *